(12) United States Patent
Cherian et al.

(10) Patent No.: US 8,380,971 B2
(45) Date of Patent: Feb. 19, 2013

(54) INFORMATION HANDLING SYSTEMS INCLUDING NETWORK ADAPTERS AND METHODS OF BOOTING THE INFORMATION HANDLING SYSTEMS USING BOOT CONFIGURATION INFORMATION FROM REMOTE SOURCES

(75) Inventors: Jacob Cherian, Austin, TX (US); Gaurav Chawla, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 1112 days.

(21) Appl. No.: 12/326,588

(22) Filed: Dec. 2, 2008

(65) Prior Publication Data

US 2010/0138642 A1 Jun. 3, 2010

(51) Int. Cl.
G06F 15/177 (2006.01)
(52) U.S. Cl. .......................................... 713/2
(58) Field of Classification Search ........................ 713/2
See application file for complete search history.

(56) References Cited

U.S. PATENT DOCUMENTS

| | | | | |
|---|---|---|---|---|
| 5,764,593 | A * | 6/1998 | Turpin et al. | 713/2 |
| 7,398,382 | B2 * | 7/2008 | Rothman et al. | 713/2 |
| 7,610,481 | B2 * | 10/2009 | Cool et al. | 713/2 |
| 7,917,614 | B2 * | 3/2011 | Haneefa et al. | 709/224 |
| 2004/0153639 | A1 | 8/2004 | Cherian et al. | |
| 2006/0277328 | A1 | 12/2006 | Cherian et al. | |

* cited by examiner

*Primary Examiner* — Kim Huynh
*Assistant Examiner* — Eric Chang
(74) *Attorney, Agent, or Firm* — Larson Newman, LLP (57) ABSTRACT

A system can be operable to receive boot configuration information from a remote source independent of the type of initiator (e.g., software or hardware) used by an information handling system. The information handling system having the initiator can be coupled to the remote source, which includes the boot configuration information, and a storage array that includes a boot image. While operating within a pre-operating system (pre-OS) environment, the information handling system can create a boot configuration table and populate the boot configuration table with the boot configuration information. The boot configuration information can include an address for the boot image and information for configuring an OS initiator to be used when loading the OS.

20 Claims, 4 Drawing Sheets

INFORMATION HANDLING SYSTEMS INCLUDING NETWORK ADAPTERS AND METHODS OF BOOTING THE INFORMATION HANDLING SYSTEMS USING BOOT CONFIGURATION INFORMATION FROM REMOTE SOURCES

FIELD OF THE DISCLOSURE

This disclosure relates generally to information handling systems, and more particularly to information handling systems including network adapters and methods of booting the information handling systems using boot configuration information from remote sources.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Figure 1:
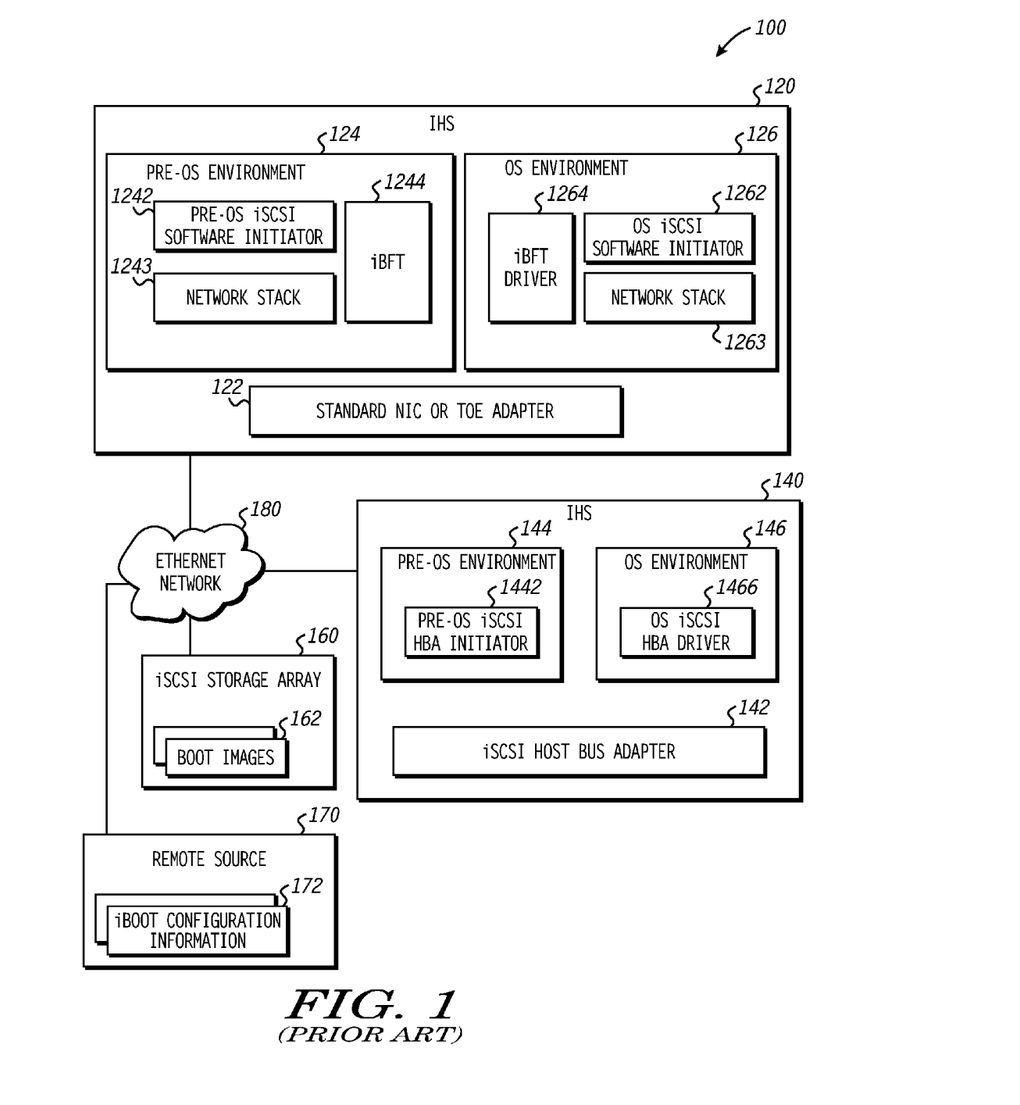
FIG. 1 includes a function block diagram of IHSes coupled to a storage array having different boot images. (Prior Art)

The ability to boot an information handling system with a remotely stored boot image is becoming more important. The remotely stored boot image can allow for quicker re-provisioning of an information handling system, and particularly a server, and also allow for better management and control of boot images. FIG. 1 includes an illustration of a block diagram of a system 100 that includes information handling systems 120 and 140 that are coupled to an Ethernet network 180, which is coupled to an Internet Small Computer System Interface (iSCSI) storage array 160. The storage array 160 includes a plurality of different boot images 162.

The information handling system (IHS) 120 includes a conventional Network Interface Card (NIC) or Transmission Control Protocol/Internet Protocol (TCP/IP) Offload Engine Adapter (or TOE Adapter) 122. The NIC or TOE Adapter 122 that support boot operates using a software initiator when booting within pre-operating system (pre-OS) and operating system (OS) environments 124 and 126. When the booting sequence starts, bootstrap code within a Basic Input/Output System (BIOS) executes code such that the IHS 120 is operating within the pre-OS environment 124. The bootstrap code includes code for a pre-OS iSCSI software initiator 1242. The pre-OS iSCSI software initiator 1242 the network stack 1246 is is started. The pre-OS iSCSI software initiator 1242 also allows the IHS 120 to communicate using the NIC or TOE Adapter 122 using the iSCSI protocol in the pre-OS environment 124 with the iSCSI storage array 160, to start the boot process from one of the boot images 162. The pre-OS software iSCSI initiator is configured with boot configuration information (information about the address of the iSCSI storage device and location within the storage device of its boot image) to start the boot process for the HIS 120. Also, an iSCSI Boot Firmware Table (iBFT) 1244 is created while the IHS 120 is operating within the pre-OS environment 124. The iBFT 1244 is populated with information from the boot configuration information 172 while the information handling system 120 is within the pre-OS environment 124.

As part of the boot process in the OS environment 126, the network stack 1263, the OS iSCSI software initiator 1262, and the iBFT driver 1264 are started. The iBFT driver 1264 obtains boot information from the iBFT 1244 to configure and run an OS iSCSI software driver 1264 while the IHS 120 is within the OS environment 126 as part of the boot process.

Because software initiators are used, a standard application program interface can be used for configuration of boot regardless of the particular vendor of the NIC or TOE Adapter 122. Thus a common boot configuration client 1246 in the pre-OS environment 124 can be used for a given pre-OS iSCSI software initiator 1242 to configure the boot configuration information. The boot configuration client 1246 can communicate with the remote source 170 that contains boot configuration information 172 for multiple IHS to obtain the via an Ethernet network 180 to obtain the boot configuration information for this IHS 120. The boot configuration information 172 includes an address (e.g., a pointer) for a boot image for the IHS 120.

Unlike the IHS 120, the IHS 140 includes a different network adapter. More particularly, the IHS 140 includes an iSCSI Host Bus Adapter (iSCSI HBA) 142. When the booting sequence starts, the BIOS executes bootstrap code such that the IHS 140 is operating within the pre-OS environment 144. The bootstrap code includes code to interface to a pre-OS iSCSI HBA initiator 1442, which may be software that can interface with the iSCSI HBA or is integrated into the iSCSI HBA. Like the IHS 120, for IHS 140 the pre-OS iSCSI HBA initiator 1442 and iSCSI Host Bus Adapter 142 is configured with the information of where to find the boot image for the IHS 140 (boot configuration information). The boot process is started with the pre-OS iSCSI HBA initiator 1442. Boot continues through the iSCSI Host Bus Adapter 142 in the OS environment 146 (with the boot configuration information in the iSCSI Host Bus Adapter 142 configured in it in the pre-OS environment 144) after configuring and starting the OS iSCSI HBA driver 1466, which is the particular hardware driver for the iSCSI Host Bus Adapter 142.

A particular problem with hardware initiators, and their application programming interfaces to configure information for boot, is that they are specific to particular manufacturers of the corresponding hardware. More particularly, different manufacturers of the same type of hardware may have different application programming interfaces. Even within the same manufacturer, different generations of the same type of hardware may also have different application programming interfaces. Thus to remotely configure the boot information for the IHS 140 using boot configuration information 172 in the remote source 170, a boot configuration client 1446 has to implement many different application program interfaces for each specific iSCSI Host Bus Adapter, which is undesirable.

BRIEF DESCRIPTION OF THE DRAWINGS

The present disclosure may be better understood, and its numerous features and advantages made apparent to those skilled in the art by referencing the accompanying drawings.

Skilled artisans appreciate that elements in the figures are illustrated for simplicity and clarity and have not necessarily been drawn to scale. For example, the dimensions of some of the elements in the figures may be exaggerated relative to other elements to help improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

An IHS can include a software or a hardware initiator that can be used to boot the IHS. As described herein, a boot configuration table is created and populated with boot configuration information sent from a remote source and received by the IHS when the IHS is operating within the pre-OS environment. As used herein "remote" means that an item, such as boot configuration information that includes information about the boot image, an OS, or the like, is not resident in the IHS. In the pre-OS environment, boot starts with the pre-OS initiator, with boot configuration information retrieved from the boot configuration table. The boot configuration table includes an address (e.g., a pointer, dependent on the protocol over which the IHS is connected to the boot image on the storage device) for the boot image to be used for the particular IHS. When the boot proceeds to the OS environment and the boot image is loaded, a boot configuration interface component is loaded and operates within the OS environment. The boot configuration interface component accesses the boot configuration table and uses it to configure the software or hardware initiator for continuing the boot in the OS environment. Thus, the system does not require separate APIs for each of the different hardware and software initiators. Also, the systems and methods described herein are well suited for an IHS that is a bare metal system.

As used herein, the term "bare metal system," with respect to an IHS, is intended to mean that the IHS does not have a locally persisted copy of an OS (Windows Vista™, Mac OS X™, Solaris 10™, or the like). In a particular embodiment, the IHS that is a bare metal system may not have any software but may have platform firmware, such as a basic input/output system (BIOS), adapter firmware, or the like.

Figure 2:
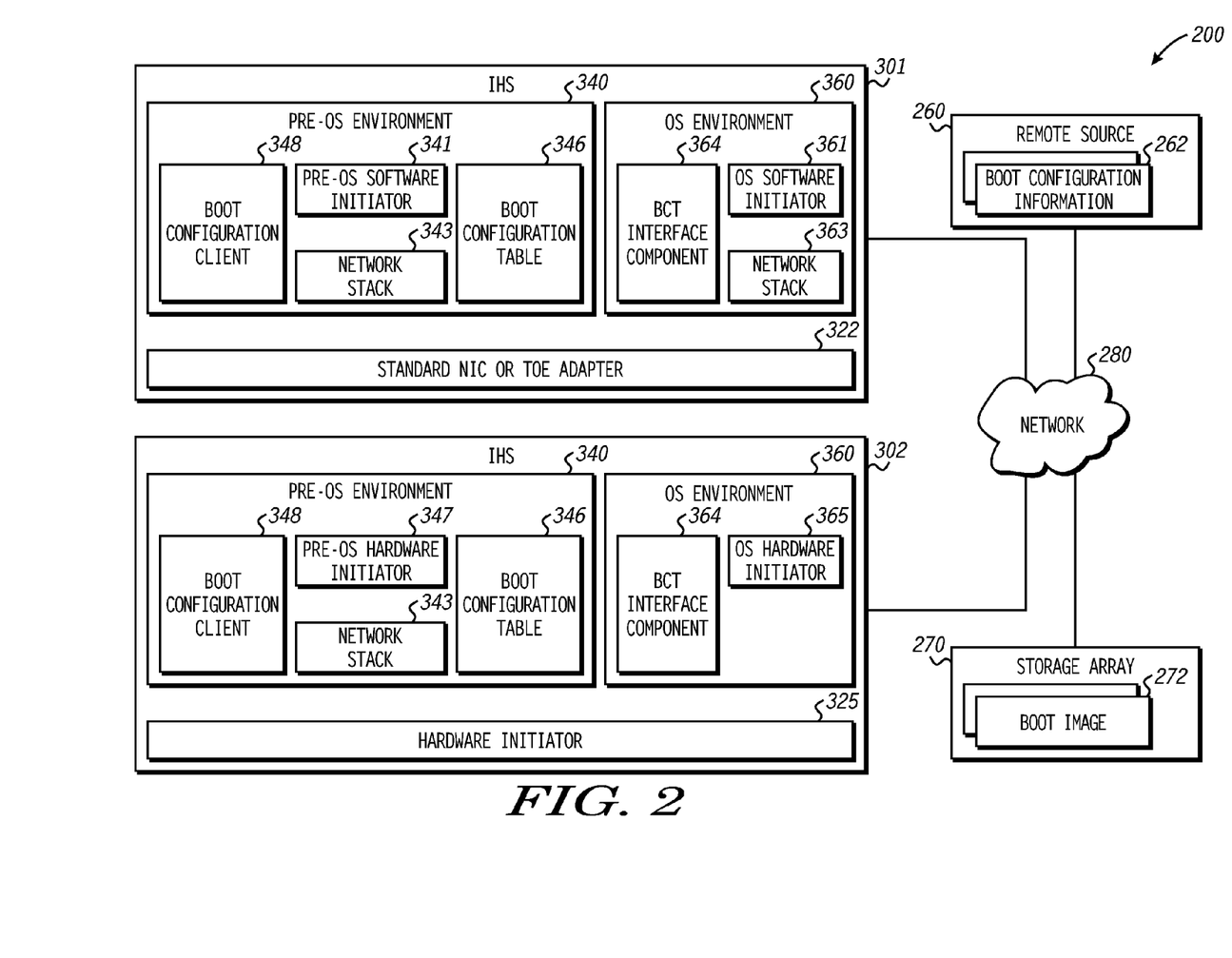
FIG. 2 includes a function block diagram of IHSes coupled to a storage array having different boot images, wherein the IHSes can be operated in accordance with embodiments described herein.

FIG. 2 includes an illustration of a block diagram of an architecture including IHSes 301 and 302, coupled to a network 280. A remote source 260 includes different sets of boot configuration information 262 and is coupled to the network 280, and a storage array 270 includes a set of different boot images 272 and is also coupled to the network 280.

In an embodiment, the remote source 260 can be a storage array, a database server, a network storage device, or other suitable system can be used to provide the boot configuration information to the IHSes 301 and 302. The boot configuration information 262 can be organized into different sets of boot configuration information. The boot configuration information 262 includes information that the IHSes 301 and 302 use for the boot. The boot configuration information can include identification information about the storage device to be used for boot, information about the logical unit within the storage device that has the boot image, redundancy information for boot (if applicable), any other configuration information for the storage protocol or the boot initiator/host adapter, or any combination thereof.

The storage array 270 includes physical storage devices and is arranged into logical units. The storage array 270 includes boot images that are used by the IHSes 301 and 302. In a particular embodiment, each boot image includes the operating system that is to be loaded.

The network 280 can be a local area network, a wide area network, a private network, a public network (e.g., the Internet), or any combination thereof. One or more communication protocols can be used within the network 280 to support iSCSI, Fibre Channel Over Ethernet (FCOE), Serially Attached SCSI (SAS), or the like. In a non-limiting particular embodiment, the network 280 can be an ethernet network that communicates using iSCSI devices, and the storage array 270 can be an iSCSI storage array. In another embodiment (not illustrated), the remote source 260 and the storage array 270 may be coupled to different networks.

The IHS 301 includes a network adapter, such as a standard NIC or TOE adapter 322, that can be used with a software initiator. The IHS 302 includes a network adapter, such as hardware initiator 325 (e.g., an HBA adapter that implements the protocol used for boot on the adapter). The IHSes 301 and 302 are illustrated and described with respect to many components. The components are addressed before describing particular configurations of particular IHSes. Thus, some of the components may or may not be present within IHS 301 or 302. After reading this specification, skilled artisans will appreciate that a particular selection of components may be made based on the needs or desires for a particular application. The booting sequence is described generically with respect to IHSes 301 and 302. After reading this specification, skilled artisans will appreciate that the description below can be tailored to a particular IHS.

When a booting sequence starts, bootstrap code within a BIOS executes code such that the IHS is operating within the pre-OS environment 340. The bootstrap code includes code for a pre-OS initiator, such as a pre-OS software initiator 341 or a pre-OS hardware initiator 347 depending on whether a software initiator or hardware initiator is used for the boot. The pre-OS environment 340 also includes a boot configuration client 348 that can retrieve the boot configuration information 262 for the IHS from the remote source 260. The boot configuration information 262 can be used to create a boot configuration table 346 by the pre-OS environment 340. In general, the boot configuration table 346 can be in the form of a standard memory table that can be readily accessed by the IHS. In a particular embodiment, the boot configuration table 346 can be an iBFT. Other tables can be used for other storage protocols, such as Fibre Channel or Fibre Channel Over Ethernet, or the like. Thus, the concepts herein are not limited to any particular storage protocol. An exemplary, non-limiting embodiment, the boot configuration table 346 can include identification information about the initiator/host adapter to be used for boot, identification information about the storage device to be used for boot, information about the logical unit within the storage device that has the boot image, redundancy information for boot (if applicable), any other configuration information for the storage protocol or the boot initiator/host adapter, or any combination thereof. For simplicity, the term "address" is used to refer to information that can be used in making a request to or locating or accessing a file, an image, or the like.

The pre-OS software initiator 341 can be operable to allow the boot configuration client 348 to access the standard NIC or TOE adapter 322 over the network stack 343 to communicate with the remote source 260 to obtain boot configuration information 262. Similarly, the pre-OS hardware initiator 347 can be operable to allow the boot configuration client to access the hardware initiator 325 to communicate with the remote source 260 to obtain boot configuration information 262. Alternatively, the boot configuration client 348 can access the standard NIC or TOE adapter 322 over the network stack 343 to communicate with the remote source 260 to obtain boot configuration information 262. Either the pre-OS initiator or the boot configuration client 348 can be operable to populate the boot configuration table 346 with the boot configuration information 262. The boot configuration information 262 includes the address for the boot image and configuration information that can be used for the OS initiator.

The initiator in the operating system, such as an OS software initiator 361 or a hardware initiator 325, can operate within the OS environment 360. A boot configuration table (BCT) interface component 364 can be started while within the OS environment 360 and be used to obtain boot information from the boot configuration table 346. The BCT interface component 364 may depend on the particular storage protocol used and have a conventional or proprietary design. In a particular embodiment, the BCT interface component 364 can be a driver that can access an iBFT when the iSCSI protocol is used. Another interface component may be used if the storage protocol is different (e.g., FCOE, SAS, or the like). The pre-OS initiator can be operated until an OS software initiator 361 or an OS hardware initiator driver 365 is started. The OS software initiator 361 can be configured with the information obtained from the boot configuration table 346 and started in the OS environment 360. Alternatively the OS hardware initiator driver 365 can be started in the OS environment and can configure the hardware initiator 325 using information obtained from the boot configuration table 346. The OS software initiator 361 accesses the boot image 272 on the storage array 270 through the network stack 363 and the standard NIC or TOE adapter 322 to continue the boot process while in the OS environment 360. Alternatively the OS hardware initiator driver accesses the image 272 on the storage array 270 through the hardware initiator 325 to continue the boot process in the OS environment 360.

Other options exist regarding some of the implementation details. In a particular embodiment, an OS driver (e.g., OS hardware initiator driver 365) can be started and find the configuration boot table 346. The OS driver can then load information from the boot configuration table 346 into the initiator in the OS (e.g., the hardware initiator 325) and continue with the loading of the OS. Alternatively, in the pre-OS environment, when the boot configuration information is received by the IHS, such boot configuration information can be persisted in memory of the physical hardware of the network adapter (e.g., in memory of the card including the network adapter), and when the OS driver starts, it reads the information from the memory. After reading this specification, skilled artisans will appreciate that other alternatives can be used and tailored to the particular needs or desires for a particular application.

Figure 3:
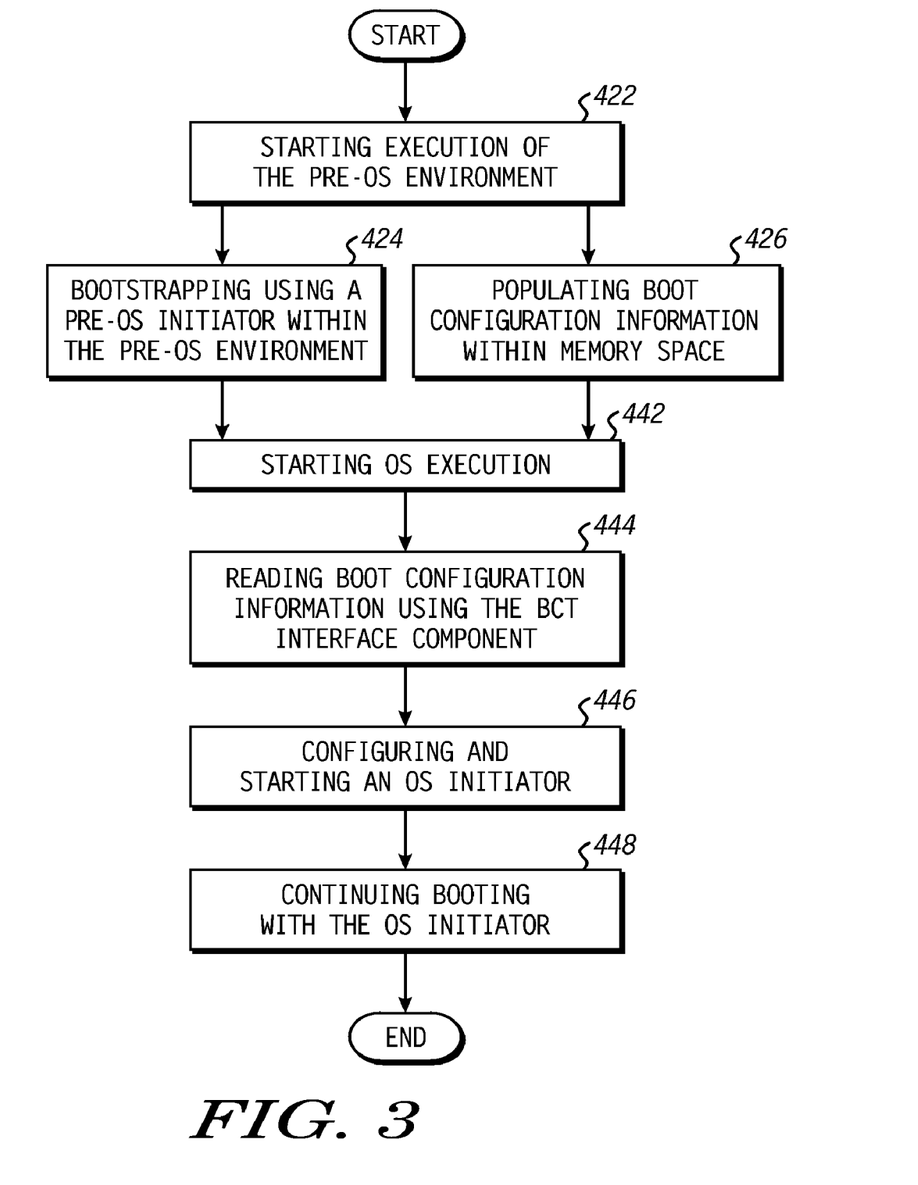
FIG. 3 includes a flow diagram of a method of booting an IHS in accordance with a particular embodiment.

FIG. 3 includes a flow chart that illustrates an exemplary, non-limiting method of using the IHS 300 during a booting sequence. References will be made to FIG. 2 to provide details to aid in understanding of, but not limit, the method. The method includes starting execution of the pre-OS environment 340, at block 422 of FIG. 3. The IHS may be initially powered up or may be rebooted. Bootstrap code within the BIOS of the IHS will be executed, and the IHS will be operating within the pre-OS environment 340.

The method can also include bootstrapping using a pre-OS initiator within the pre-OS environment, at block 424, and populating boot configuration information within memory space, at block 426. The actions of blocks 424 and 426 may be performed in parallel (as illustrated) or serially (not illustrated). The bootstrapping can be performed with the pre-OS initiator, such as the pre-OS software initiator 341 or the pre-OS hardware initiator 347. A network stack 343 is created in the pre-OS environment that allows for the boot configuration client 348 to communicate with the remote source 260 via the network 280 to retrieve the boot configuration information 262. The pre-OS environment can create and populate the boot configuration table 346 with the boot configuration information 262 within the memory space of the IHS 301 or 302. The memory space can be physically located within a random access memory, a hard disk drive, a solid-state drive, or another suitable memory, or any combination thereof. The boot configuration information can include the address for the boot image 272 that is to be retrieved from the storage array 270. The boot image 272 includes the OS that is to be loaded into the IHS. Independent of the network adapter used, the pre-OS initiator (341 or 347) can allow for communication with the storage array 270 to start the boot process using the address information in the boot configuration table 346.

The method can also include starting the OS execution, at block 442, and reading boot configuration information using the BCT interface component, at block 444 in FIG. 3. In a particular embodiment, the boot configuration interface component 364 can be started during the OS execution. The BCT interface component 364 can read the boot configuration information 262 that resides in the boot configuration table 344. The method can further include configuring and starting an OS software or hardware initiator, at block 446 in FIG. 3. The boot configuration information within the boot configuration table 344 is retrieved using the BCT interface component 364. The BCT interface component 364 can use the boot configuration information to configure the OS initiator in the operating system, such as the OS software initiator 361 or the OS hardware initiator driver 365. After the initiator is configured, it can be started. The method still further includes continuing booting using the OS initiator, at block 448 in FIG. 3. In The OS initiator can be used in continuing the booting sequence of the IHS 301 or 302 and after the OS is loaded.

The systems and methods described above are useful for a wide variety of different IHSes. For purposes of this disclosure, an IHS can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS can be a personal computer, a PDA, a consumer electronic device, a network server or storage device, a switch router, wireless router, or other network communication device, or any other suitable device and can vary in size, shape, performance, functionality, and price. The IHS can include memory, one or more processing resources such as a central processing unit (CPU) or hardware or software control logic. Additional components of the IHS can include one or more storage devices, one or more communications ports for communicating with external devices, as well as various input and output (I/O) devices, such as a keyboard, a mouse, and a video display. The IHS can also include one or more buses operable to transmit communications between the various hardware components.

Figure 4:
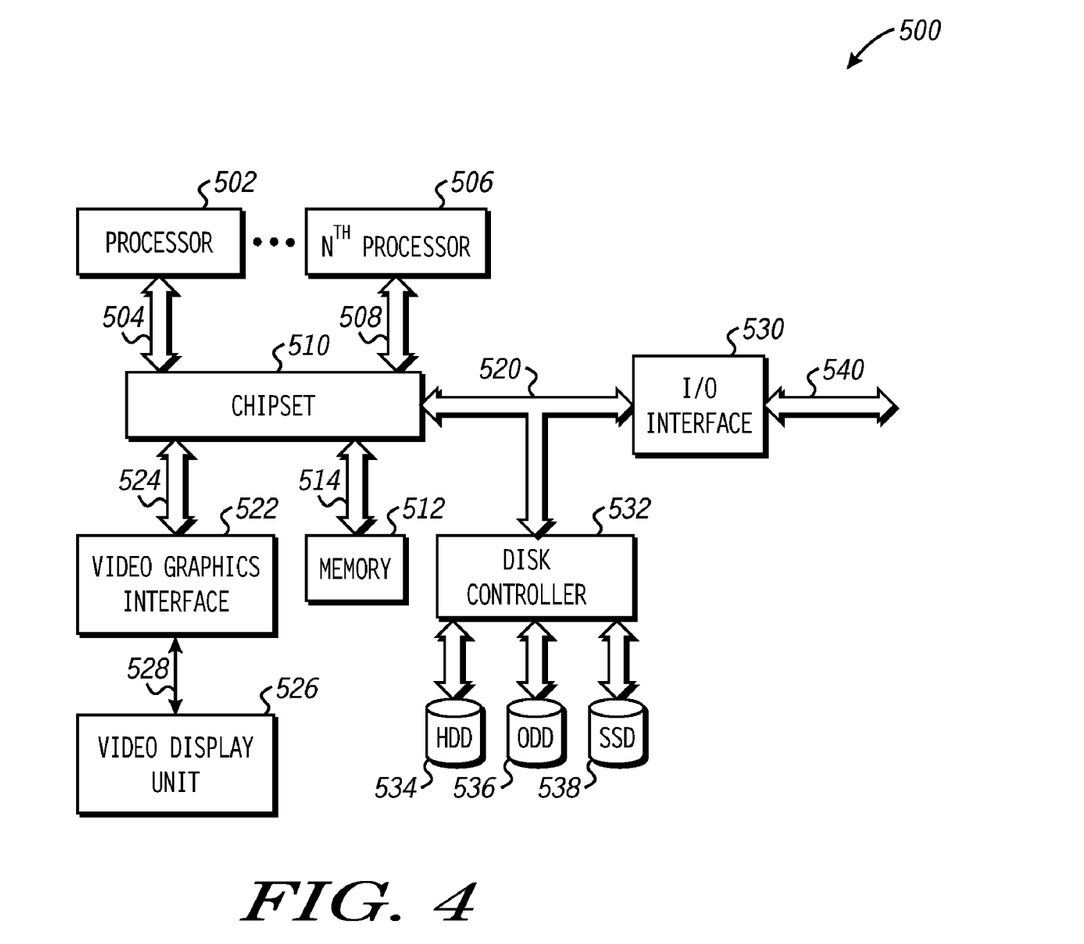
FIG. 4 includes a block diagram of an IHS according to an aspect of the disclosure.

FIG. 4 illustrates a block diagram of an exemplary embodiment of an IHS, generally designated at 500. In one form, the IHS 500 can be a computer system such as a server. As shown in FIG. 4, the IHS 500 can include a first physical processor 502 coupled to a first host bus 504 and can further include additional processors generally designated as $n^{th}$ physical processor 506 coupled to a second host bus 508. The first physical processor 502 can be coupled to a chipset 510 via the first host bus 504. Further, the $n^{th}$ physical processor 506 can be coupled to the chipset 510 via the second host bus 508. The chipset 510 can support multiple processors and can allow for simultaneous processing of multiple processors and support the exchange of information within IHS 500 during multiple processing operations.

According to one aspect, the chipset 510 can be referred to as a memory hub or a memory controller. For example, the chipset 510 can include an Accelerated Hub Architecture (AHA) that uses a dedicated bus to transfer data between the physical processor 502 and the $n^{th}$ physical processor 506. For example, the chipset 510 including an AHA enabled-chipset can include a memory controller hub and an I/O controller hub. As a memory controller hub, the chipset 510 can function to provide access to first physical processor 502 using first bus 504 and $n^{th}$ physical processor 506 using the second host bus 508. The chipset 510 can also provide a memory interface for accessing memory 512 using a memory bus 514. In a particular embodiment, the buses 504, 508, and 514 can be individual buses or part of the same bus. The chipset 510 can also provide bus control and can handle transfers between the buses 504, 508, and 514.

According to another aspect, the chipset 510 can be generally considered an application specific chipset that provides connectivity to various buses, and integrates other system functions. For example, the chipset 510 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 510. The chipset 510 can also be packaged as an application specific integrated circuit (ASIC).

The IHS 500 can also include a video graphics interface 522 that can be coupled to the chipset 510 using a third host bus 524. In one form, the video graphics interface 522 can be an Accelerated Graphics Port (AGP) interface to display content within a video display unit 526. Other graphics interfaces may also be used. The video graphics interface 522 can provide a video display output 528 to the video display unit 526. The video display unit 526 can include one or more types of video displays such as a flat panel display (FPD) or other type of display device.

The IHS 500 can also include an I/O interface 530 that can be connected via an I/O bus 520 to the chipset 510. The I/O interface 530 and I/O bus 520 can include industry standard buses or proprietary buses and respective interfaces or controllers. For example, the I/O bus 520 can also include a Peripheral Component Interconnect (PCI) bus or a high speed PCI-Express bus. In one embodiment, a PCI bus can be operated at approximately 66 Mhz and a PCI-Express bus can be operated at approximately 128 Mhz. PCI buses and PCI-Express buses can be provided to comply with industry standards for connecting and communicating between various PCI-enabled hardware devices. Other buses can also be provided in association with, or independent of, the I/O bus 520 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 510 can be a chipset employing a Northbridge/Southbridge chipset configuration (not illustrated). For example, a Northbridge portion of the chipset 510 can communicate with the first physical processor 502 and can control interaction with the memory 512, the I/O bus 520 that can be operable as a PCI bus, and activities for the video graphics interface 522. The Northbridge portion can also communicate with the first physical processor 502 using first bus 504 and the second bus 508 coupled to the $n^{th}$ physical processor 506. The chipset 510 can also include a Southbridge portion (not illustrated) of the chipset 510 and can handle input/output (I/O) functions of the chipset 510. The Southbridge portion can manage the basic forms of I/O such as Universal Serial Bus (USB), serial I/O, audio outputs, Integrated Drive Electronics (IDE), and ISA I/O for the IHS 500.

The IHS 500 can further include a disk controller 532 coupled to the I/O bus 520, and connecting one or more internal disk drives such as a hard disk drive (HDD) 534, an optical disk drive (ODD) 536, and a solid-state drive (SSD) 538.

The IHS 500 can further include a Basic Input/Output System (BIOS) 552 that can be coupled to the chipset 510 using a system bus 554. In one form, BIOS 552 can include code to bootstrap the IHS 500 while operating in the pre-OS environment until the operating system is loaded. The BIOS 552 can include code for a software or hardware initiator that can allow a network adapter to communicate with another system or device on a network until a software or hardware driver can be configured and run within the OS environment.

The IHS 500 can also include the I/O interface 540. The I/O interface 540 includes a network adapter that is operably coupled to an external communication bus that is operable to be coupled to a network, such as a local area network, a wide area network, a private network, a public network (e.g., the Internet), or any combination thereof.

The IHS 500 can be a particular embodiment of the IHS 301, 302, an IHS at the remote source 260, the storage array 270, or another IHS coupled to the network 280 or used to operate the network (e.g., switches, routers, management servers), or any combination thereof.

The concepts as described herein can be used for many different types of IHSes, as previously described. The methods can also be used for starting or rebooting virtual machines operating within an IHS. Similar to the prior embodiment, a virtual machine may be configured and operable to serve a particular function, and the virtual machine would then have another particular function that needs or is desired to be performed. The virtual machine can be rebooted substantially similar to the process described with respect to FIG. 3. In addition, many other IHSes can be coupled to the remote source and be booted and operated as described herein. Different IHSes can be booted at substantially the same time, partially overlap each other in time or at completely different (non-overlapping) times.

In accordance with the concepts as described herein, an architecture has been developed in which an IHS system, regardless of the particular type of network adapter or storage communication protocol used, can receive boot configuration information from a remote source and be used during the boot sequence. In this manner, separate APIs are not required for all of the different types of network adapters. Thus, less APIs are generated for systems that receive their boot configuration information from a remote source. The architecture is particularly well suited for bare metal systems in which operating systems are loaded from a remotely located storage array. The method can also be useful in reprovisioning information handling systems. For example, the IHS may be configured and operated as a file server, but another domain name server is needed or desired. The boot configuration information for a file server may be different from the boot configuration information for a domain name server. The method can allow the IHS to be rebooted, so that it is properly configured to operate as a domain name server.

Many different aspects and embodiments are possible. Some of those aspects and embodiments are described below. After reading this specification, skilled artisans will appreciate that those aspects and embodiments are only illustrative and do not limit the scope of the present invention.

In a first aspect, a method of booting an information handling system can include starting a first initiator within a first pre-OS environment for a first information handling system having a first network adapter. The method can also include receiving first boot configuration information for the first information handling system from a remote source, wherein receiving is performed independent of a type of network adapter used in the information handling system.

In an embodiment of the first aspect, the first initiator includes a hardware initiator. In a particular embodiment, the method further includes using the first boot configuration table to determine an address for a first boot image that is to be used to boot the first information handling system. In another particular embodiment, the method further includes creating a first boot configuration table while operating within the first pre-OS environment, and populating the first boot configuration table with the first boot configuration information while within the first pre-OS environment. In a more particular embodiment, the information handling system further includes booting an operating system (OS) using the first initiator, wherein the first initiator is an initiator within the pre-OS and OS environments.

In another more particular embodiment of the first aspect, the method further includes starting a second pre-OS initiator within a second pre-OS environment for a second information handling system. The method also includes creating a second boot configuration table while operating within the second pre-OS environment, receiving second boot configuration information for the second information handling system from the remote source, and populating the second boot configuration table with the first second configuration information while within the second pre-OS environment.

In an even more particular embodiment of the first aspect, the method further includes using the second boot configuration table to determine an address for a second boot image that is to be used to boot the second information handling system. The first and second boot images are at different units within the storage array.

In yet another more particular embodiment, the method further includes using the second boot configuration information to configure an OS software initiator for the second network adapter, and using the OS software initiator to continue booting the second information handling system within an OS environment. In a further more particular embodiment, the method further includes starting a second pre-OS environment for the first information handling system, creating the first boot configuration table while operating within the second pre-OS environment, receiving second boot configuration information for the first information handling system from the remote source, wherein the second boot configuration information is different from the first boot configuration information; and populating the second boot configuration table with the second boot configuration information while operating within the second pre-OS environment. In an even more particular embodiment, the first boot configuration information or the second boot configuration information includes an address for a boot image for a virtual machine operable to run within the first information handling system.

In a second aspect, a system can include a remote source including different sets of boot configuration information, wherein the different sets include first boot configuration information, and a storage array including different boot images, wherein the different boot images include a first boot image. The system can also include a first information handling system coupled to and separate from the remote source and storage array, wherein the first information handling system includes a first network adapter. The first information handling system is operable to start a first initiator within a first pre-OS environment, create a first boot configuration table while operating within the first pre-OS environment, receive first boot configuration information from a remote source, and populate the first boot configuration table with the first boot configuration information while within the first pre-OS environment. The creation and populating of the first boot configuration table is performed independent of a type of network adapter used in the first information handling system.

In an embodiment of the second aspect, the first initiator includes a hardware initiator. In a particular embodiment, the first information handling system is further operable to use the hardware initiator within an OS environment.

In still another embodiment, the system further includes a second information handling system coupled to separate from the remote source, the storage array, and the first information handling system, wherein the second information handling system includes a second network adapter. The second information handling system is operable to start a pre-OS software initiator within a second pre-OS environment, receive second boot configuration information from the remote source, use the second boot configuration information to configure an OS software initiator for the second network adapter, and use the OS software initiator to continue booting the second information handling system within an OS environment. In a further embodiment, the first information handling system is further operable to start within a second pre-OS environment, and receive second boot configuration information from the remote source, wherein the second boot configuration information is different from the first boot configuration information. In a particular embodiment, the first boot configuration information or the second boot configuration information includes an address for a boot image for a virtual machine operable to run within the first information handling system.

After reading this specification, the functionality or performance of the methods described herein can be implemented in hardware, firmware, software, other machine-readable code, or any combination thereof. Further, methods described herein can be performed automatically; however, a portion of the method can be performed manually if needed or desired.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciated that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A method of booting an information handling system comprising:
    starting a first initiator within a first pre-operating system (pre-OS) environment for a first information handling system having a host bus adapter;
    receiving first boot configuration information for the first information handling system from a remote source, while within the first pre-OS environment;
    starting a second initiator associated with the host bus adapter within a first operating system (OS) environment for the first information handling system; and
    accessing the first boot configuration information via the second initiator, while within the first OS environment.

2. The method of claim 1, wherein the first initiator comprises a hardware initiator.

3. The method of claim 2, further comprising using a first boot configuration table to determine an address for a first boot image that is to be used to boot the first information handling system.

4. The method of claim 2, further comprising:
    creating a first boot configuration table while operating within the first pre-OS environment; and
    populating the first boot configuration table with the first boot configuration information while within the first pre-OS environment.

5. The method of claim 4, further comprising booting an OS using the second initiator, wherein the first initiator and the second initiator are a same initiator.

6. The method of claim 4, further comprising:
    starting a pre-OS software initiator to start within a second pre-OS environment for a second information handling system having a network adapter;
    creating a second boot configuration table while operating within the second pre-OS environment;
    receiving second boot configuration information for the second information handling system from the remote source; and
    populating the second boot configuration table with the second configuration information while within the second pre-OS environment.

7. The method of claim 6, further comprising:
    using the second boot configuration information to configure an OS software initiator for the network adapter; and
    using the OS software initiator to continue booting the second information handling system within a second OS environment.

8. The method of claim 6, further comprising using the second boot configuration table to determine an address for a second boot image that is to be used to boot the second information handling system.

9. The method of claim 8, wherein the first and second boot images are at different logical units within a storage array.

10. The method of claim 9, wherein the first boot configuration information or the second boot configuration information includes an address for a boot image for a virtual machine operable to run within the first information handling system.

11. The method of claim 1, further comprising:
    starting a second pre-OS environment for the first information handling system;
    creating a second boot configuration table while operating within the second pre-OS environment;
    receiving second boot configuration information for the first information handling system from the remote source, wherein the second boot configuration information is different from the first boot configuration information; and
    populating the second boot configuration table with the second boot configuration information while operating within the second pre-OS environment.

12. A system comprising:
    a remote source comprising different sets of boot configuration information, wherein the different sets include first boot configuration information;
    a storage array comprising different boot images, wherein the different boot images include a first boot image; and
    a first information handling system coupled to and separate from the remote source and storage array, wherein the first information handling system comprises a host bus adapter, wherein the first information handling system is operable to:
        start a first initiator within a first pre-OS environment;
        create a first boot configuration table while operating within the first pre-OS environment;
        receive first boot configuration information from a remote source; and
        populate the first boot configuration table with the first boot configuration information while within the first pre-OS environment,
        start a second initiator associated with the host bus adapter within a first operating system (OS) environment for the first information handling system; and
        access the first boot configuration table via the second initiator, while within the first OS environment.

13. The system of claim 12, wherein the first initiator comprises a hardware initiator.

14. The system of claim 13, wherein the first information handling system is further operable to use the hardware initiator within the first OS environment.

15. The system of claim 12, further comprising:
    a second information handling system coupled to and separate from the remote source, the storage array, and the first information handling system, wherein the second information handling system comprises a network adapter, wherein the second information handling system is operable to:
 start a pre-OS software initiator within a second pre-OS environment;
 receive second boot configuration information from the remote source;
 use the second boot configuration information to configure an OS software initiator for the network adapter; and
 use the OS software initiator to continue booting the second information handling system within a second OS environment.

16. The system of claim 12, wherein the first information handling system is further operable to:
 start within a second pre-OS environment; and
 receive second boot configuration information from the remote source, wherein the second boot configuration information is different from the first boot configuration information.

17. The system of claim 16, wherein the first boot configuration information or the second boot configuration information includes an address for a boot image for a virtual machine operable to run within the first information handling system.

18. Machine-executable code embedded within a non-transitory machine-readable medium, wherein the machine-executable code includes instructions for carrying out a method comprising:
 starting a first initiator within a first pre-OS environment for a first information handling system having a host bus adapter;
 creating a first boot configuration table while operating within the first pre-OS environment; and
 populating the first boot configuration table with first boot configuration information while within the first pre-OS environment after receiving the first boot configuration information for the first information handling system from a remote source,
 starting a second initiator associated with the host bus adapter within a first operating system (OS) environment for the first information handling system; and
 accessing the first boot configuration table via the second initiator, while within the first OS environment.

19. The machine-executable code of claim 18, wherein the first initiator comprises a hardware initiator.

20. The machine-executable code of claim 19, wherein:
 the first initiator is a software pre-OS initiator; and
 the method further comprises:
  receiving second boot configuration information for a second information handling system from the remote source;
  using the second boot configuration information to configure an OS software initiator for a network adapter of the second information handling system; and
  using the OS software initiator to continue booting the second information.

* * * * *